United States Patent
Kashihara

(10) Patent No.: US 8,701,716 B2
(45) Date of Patent: Apr. 22, 2014

(54) PROTECTIVE TEXTILE SLEEVE HAVING HIGH EDGE ABRASION RESISTANCE AND METHOD OF CONSTRUCTION

(75) Inventor: Emi Kashihara, Sagamihara (JP)

(73) Assignee: Federal-Mogul Corporation, Southfield, MI (US)

( * ) Notice: Subject to any disclaimer, the term of this patent is extended or adjusted under 35 U.S.C. 154(b) by 1079 days.

(21) Appl. No.: 12/392,156

(22) Filed: Feb. 25, 2009

(65) Prior Publication Data

US 2009/0218002 A1 Sep. 3, 2009

Related U.S. Application Data

(60) Provisional application No. 61/032,663, filed on Feb. 29, 2008.

(51) Int. Cl.
*D03D 3/02* (2006.01)
*D03D 11/02* (2006.01)
*D03D 3/00* (2006.01)

(52) U.S. Cl.
USPC ............ 139/387 R; 139/384 R; 139/420 R; 139/426 R; 139/420 A

(58) Field of Classification Search
USPC ............ 139/383 R, 384 R, 387 R, 388, 390, 139/420 R, 426 R, 420 A
See application file for complete search history.

(56) References Cited

U.S. PATENT DOCUMENTS

| | | | |
|---|---|---|---|
| 4,015,641 A | | 4/1977 | Goff, Jr. et al. |
| 4,668,545 A * | | 5/1987 | Lowe .......................... 428/35.1 |
| 4,803,103 A * | | 2/1989 | Pithouse et al. ............. 428/34.5 |
| 4,816,309 A * | | 3/1989 | Hutt et al. .................... 428/34.5 |
| 4,836,080 A | | 6/1989 | Kite, III et al. |
| 4,877,660 A * | | 10/1989 | Overbergh et al. .......... 428/34.9 |
| 5,197,370 A | | 3/1993 | Gladfelter |
| 5,238,278 A * | | 8/1993 | Kamper .......................... 294/74 |
| 5,366,771 A * | | 11/1994 | Beersel et al. ............... 428/34.9 |
| 5,413,149 A | | 5/1995 | Ford et al. |
| 5,556,495 A * | | 9/1996 | Ford et al. ..................... 156/148 |
| 5,613,522 A * | | 3/1997 | Ford et al. ..................... 138/123 |
| 5,800,514 A * | | 9/1998 | Nunez et al. ................. 623/1.51 |

(Continued)

FOREIGN PATENT DOCUMENTS

| | | |
|---|---|---|
| CN | 1277643 | 12/2000 |
| JP | 2001522950 | 11/2001 |

(Continued)

*Primary Examiner* — Bobby Muromoto, Jr.
(74) *Attorney, Agent, or Firm* — Robert L. Stearns; Dickinson Wright, PLLC

(57) ABSTRACT

A textile sleeve for protecting elongate members and method of construction thereof is provided. The sleeve includes both monofilament and multifilament yarns woven in both warp and fill directions. The warp yarns are woven in a warp-faced pattern with the fill yarns. As such, the warp yarns float over 2 or more of fill yarns. The warp monofilaments provide the sleeve with increased abrasion resistance, while the warp multifilaments provide the sleeve with increased flexibility and coverage protection to protect elongate members within a cavity of the sleeve. The fill monofilaments provide the sleeve with increased abrasion resistance and the fill multifilaments provide the sleeve with increased flexibility and coverage protection. The method includes weaving the warp and fill yarns in one of an open or closed wall construction. The method can include heat-setting the monofilament fill yarns to bias the open wall into a self-closing tubular configuration.

10 Claims, 2 Drawing Sheets

(56) References Cited

U.S. PATENT DOCUMENTS

| | | | |
|---|---|---|---|
| 5,843,542 A | 12/1998 | Brushafer et al. | |
| 6,265,039 B1 * | 7/2001 | Drinkwater et al. | 428/36.1 |
| 6,376,047 B1 | 4/2002 | Hasegawa | |
| 6,722,394 B2 * | 4/2004 | Harrison et al. | 139/383 R |
| 6,963,031 B2 * | 11/2005 | Gladfelter et al. | 174/74 A |
| 7,188,642 B2 * | 3/2007 | James et al. | 139/384 R |
| 7,216,678 B2 * | 5/2007 | Baer | 139/384 R |
| 7,600,539 B2 * | 10/2009 | Malloy et al. | 139/387 R |
| 7,628,180 B1 * | 12/2009 | Golz | 139/409 |
| 2002/0060056 A1 * | 5/2002 | Harrison et al. | 162/902 |
| 2003/0181970 A1 * | 9/2003 | Takahashi et al. | 623/1.13 |
| 2003/0204235 A1 * | 10/2003 | Edens et al. | 623/1.5 |
| 2004/0084203 A1 * | 5/2004 | Gladfelter et al. | 174/93 |
| 2005/0124249 A1 | 6/2005 | Uribarri | |
| 2005/0185902 A1 * | 8/2005 | James et al. | 385/100 |
| 2006/0016507 A1 * | 1/2006 | Baer | 139/383 R |
| 2007/0163305 A1 * | 7/2007 | Baer et al. | 66/171 |
| 2007/0166495 A1 | 7/2007 | Sellis et al. | |
| 2007/0210490 A1 * | 9/2007 | Malloy et al. | 264/425 |
| 2008/0105324 A1 * | 5/2008 | Baer | 139/386 |

FOREIGN PATENT DOCUMENTS

| | | |
|---|---|---|
| JP | 2004292985 | 10/2004 |
| JP | 2005537778 | 12/2005 |
| JP | 2006518821 | 8/2006 |
| JP | 2007514068 | 5/2007 |
| JP | 2007534850 | 11/2007 |
| JP | 2008507636 | 3/2008 |
| JP | 2009529100 | 8/2009 |
| WO | 2004020888 | 3/2004 |
| WO | 2005056898 | 6/2005 |
| WO | 2005082045 | 9/2005 |
| WO | 2006014694 | 2/2006 |

* cited by examiner

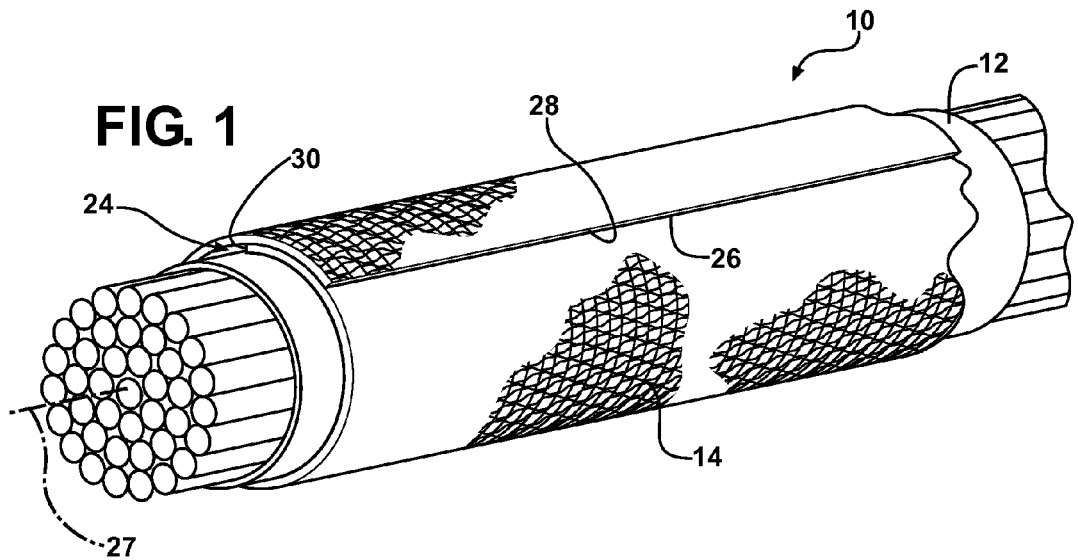
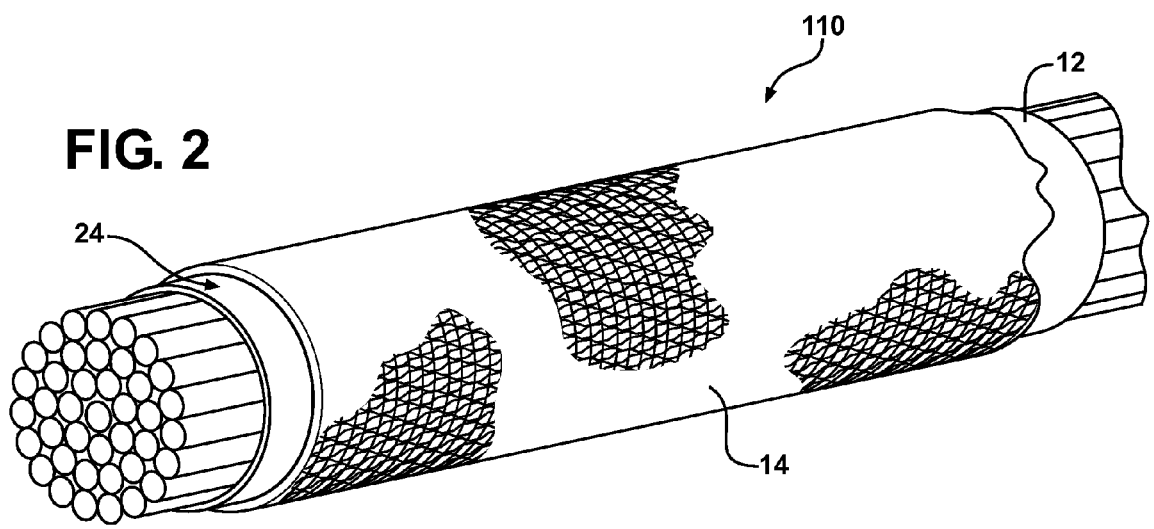

PROTECTIVE TEXTILE SLEEVE HAVING HIGH EDGE ABRASION RESISTANCE AND METHOD OF CONSTRUCTION

CROSS-REFERENCE TO RELATED APPLICATION

This application claims the benefit of U.S. Provisional Application Ser. No. 61/032,663, filed Feb. 29, 2008, which is incorporated herein by reference in its entirety.

BACKGROUND OF THE INVENTION

1. Technical Field

This invention relates generally to protective sleeving for elongate members, and more particularly to woven textile sleeves.

2. Related Art

Elongate members, such as wires or wire harnesses commonly require protection from potential external sources of abrasion. Accordingly, it is common to dispose a protective sleeve over the elongate members to provide protection against damage from abrasion and other potentially harmful conditions, such as contamination. It is known to use convolute or corrugated tubing to protect elongate members against abrasion, particularly if the potential for abrasion is relatively severe, such as from passing the elongate members through an opening having sharp corners or edges. Unfortunately, although corrugated tubing can provide the relatively good protection against abrasion, the tubing is relatively costly to manufacture, and it is typically stiff and thus, it can be difficult to route over serpentine paths or around corners. In addition, the rigid walls of the corrugated tubing can provide an internal source of abrasion to the very elongate members it is intended to protect, particularly if contaminates, such as oil and sand, come between the elongate members and the inner wall of the tubing.

As a result of the drawbacks of corrugated tubing, of which some are discussed above, other types of protective tubing are used to protect elongate members, such as textile sleeves. Textile sleeves are typically much easier to route over serpentine paths and can be less expensive to manufacture than corrugated sleeving. In addition, textile sleeves are typically softer and thus, present less of a likelihood of causing abrasion damaged to the elongate members. However, a recognized drawback to textile sleeves is that they have a reduced capacity to provide abrasion resistance protection to the elongate members from an external source of abrasion, particularly sharp corners and edges. Sharp surfaces that come into contact with the textile sleeve wall in a generally perpendicular direction are particularly damaging to the fabric of the sleeve. Over time, if the wall is cut by the sharp edge, then the elongate members become exposed and unprotected.

Accordingly, benefits and drawbacks are associated with both hard shelled tubing, such as convolute metal or plastic tubing and textile sleeves. What is needed is a protective sleeving that provides the benefits of both, while eliminating their potential drawbacks.

SUMMARY OF THE INVENTION

A textile sleeve for protecting elongate members includes both monofilament and multifilament yarns woven in a lengthwise or warp direction and a widthwise or fill direction. The warp multifilaments and monofilaments are woven in a warp-faced pattern with the fill multifilament and monofilament yarns. As such, the warp multifilaments and monofilaments float over 2 or more of fill yarns to provide the sleeve with increased flexibility. The warp monofilaments provide the sleeve with increased abrasion resistance, while at the same time, the warp multifilaments provide the sleeve with increased flexibility and coverage protection for the elongate members within a cavity of the sleeve. The fill monofilaments provide the sleeve with increased abrasion resistance and the fill multifilaments provide the sleeve with increased flexibility and coverage protection.

In accordance with another aspect of the invention, the warp multifilament and monofilament yarns are woven in a twill, warp-faced pattern.

In accordance with another aspect of the invention, the warp-faced twill pattern can be balanced, thereby having the warp yarns floating over and under the same number of fill yarns.

In accordance with another aspect of the invention, the warp-faced twill pattern can be imbalanced, thereby having the warp yarns floating over one number of fill yarns and being woven under a different number of fill yarns.

In accordance with another aspect of the invention, the multifilament and monofilament fill yarns can be dual inserted.

In accordance with yet another aspect of the invention, the warp multifilament yarns and the warp monofilament yarns can be incorporated in a ratio of about 2:1, respectively.

A textile sleeve constructed in accordance with the invention has a high level abrasion resistance to external sources of abrasion, such as sharp edges, while also providing increased levels of abrasion resistance to the elongate members within the sleeve, such as from contaminants that become between the sleeve and the elongate members. The sleeves constructed in accordance with the invention, while providing high levels of protection against abrasion, are also relatively flexible to allow them to be laid over winding paths and around sharp corners. In addition, sleeves constructed in accordance with the invention are economical in manufacture and in use, and have a long and useful life.

BRIEF DESCRIPTION OF THE DRAWINGS

These and other aspects, features and advantages of the invention will become readily apparent when considered in connection with the following detailed description of presently preferred embodiments and best mode, appended claims and accompanying drawings, in which:

FIG. 1 is a schematic perspective view of a protective sleeve constructed in accordance with one presently preferred embodiment shown protecting elongate members;

FIG. 2 is a schematic perspective view of a protective sleeve constructed in accordance with another presently preferred embodiment shown protecting elongate members;

DETAILED DESCRIPTION OF PRESENTLY PREFERRED EMBODIMENTS

Figure 4:
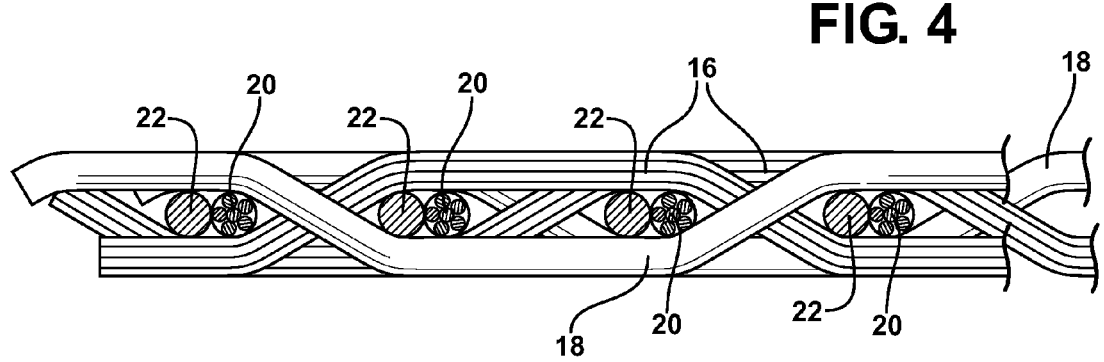
FIG. 4 is an enlarged schematic partial side view showing a weave pattern of the walls of FIG. 3.

Referring in more detail to the drawings, FIGS. 1 and 2 illustrate textile sleeves 10, 110, respectively, constructed in accordance with presently preferred embodiments for protecting elongate members 12, such as a wire harness, for example. Each of the sleeves 10, 110 is discussed hereafter using the same reference numerals to identify the structure of their respective walls 14, with the notable difference between the sleeves 10, 110 being that the sleeve 10 is woven having an "open" wall construction, while the sleeve 110 is woven having a "closed" wall construction. The wall 14 is woven from both monofilament and multifilament yarns, wherein the monofilament and multifilament yarns are woven both in a lengthwise or warp direction and a widthwise or fill direction extending about a circumference of the sleeves 10, 110. As best shown in FIG. 4, the warp multifilament yarns 16 and the warp monofilaments yarns 18 are woven in a warp-faced pattern in interlaced fashion with the fill multifilament yarns 20 and the fill monofilament yarns 22. As such, the warp multifilament yarns 16 and warp monofilament yarns 18 both float over 2 or more of the fill yarns 20, 22 to provide the sleeve 10 with increased flexibility. The warp monofilament yarns 18 can be provided of any suitable material, such as polyester, e.g. PET, and in any desired diameter to provide the sleeve with the desired level of abrasion resistance, such as from edges or other surfaces abutting the sleeve. The warp multifilament yarns 16 can be provided of any suitable material, such as polyester, e.g. PET, and having any desired text to provide the sleeve with increased flexibility and coverage protection for the elongate members 12 being protected within a cavity 24 of the sleeves 10, 110. The warp and fill monofilament yarns 18, 22 provide the sleeves 10, 110 with increased abrasion resistance and the warp and fill multifilament yarns 16, 20 provide the sleeves 10, 110 with increased flexibility, softness and coverage protection to protect the elongate members 12.

As shown in FIG. 1, the wall 14 of the sleeve 10 is woven having an "open" wall construction, thereby having a axially extending, lengthwise slit 26 extending along a longitudinal axis 27 over the full length of the sleeve 10. Otherwise, as shown in FIG. 2, the wall 14 of the sleeve 110 is woven having a "closed", circumferentially seamless construction, thus having a circumferentially continuous and uninterrupted wall. In either case, the sleeve 10 can be constructed on either narrow or broad looms, as desired. Wherein the sleeve is constructed having an open wall configuration, opposite edges 28, 30 of the wall 14 are preferably arranged in overlapping relation to one another to completely encapsulate the elongate members 12 about the circumference of the sleeve within the sleeve cavity 24. Otherwise, the wall 14 can be constructed as a self-wrapping wall, wherein the wall 14 is self-curling to take on its tubular configuration absent some external force causing the wall 14 to be opened along its length. The bias imparted in the self-wrapping wall 14 can be imparted via a heat-setting process, wherein the fill monofilament yarns of the sleeve 10 are heat-set to take on a predetermined self-wrapping tubular configuration and/or by tensioning the yarns during the weaving process. Otherwise, the wall 14 could be wrapped and fastened in its tubular configuration using any suitable fastening mechanism, such as tape, a hook and loop mechanism, snaps, or the like.

Figure 3:
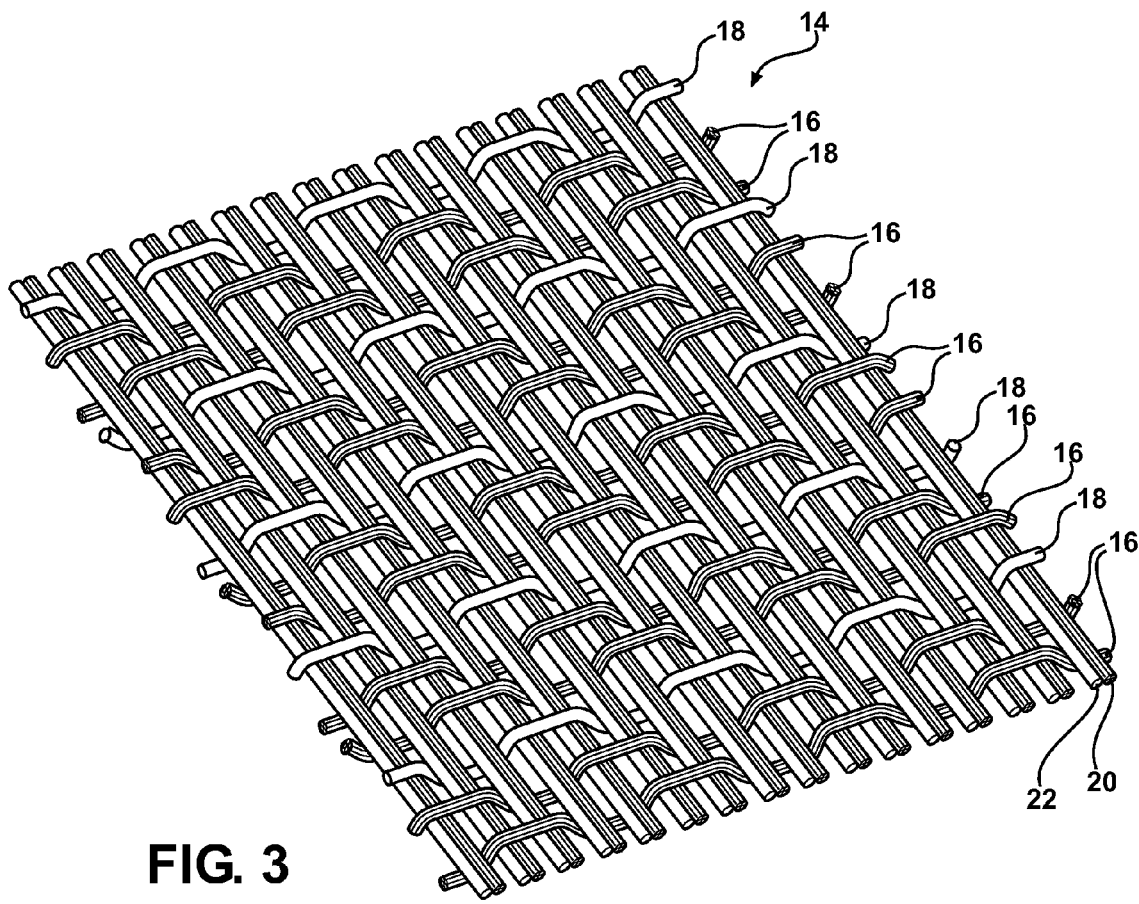
FIG. 3 is a schematic partial view of an encircled area 3 of a wall of the sleeves of FIGS. 1 and 2.

As shown in FIG. 3, the wall 14 can be constructed using a twill weave pattern, wherein the wall is represented here, by way of example and without limitation, as having a balanced 2×2 left hand, warp-faced twill weave pattern. It should be recognized that the weave pattern could be different than illustrated. Accordingly, the weave pattern could be provided as a left or right hand pattern, and further, the weave pattern could be imbalanced, wherein the warp yarns 16, 18 could float over one number of the fill yarns 20, 22, such as 2, 3 or 4 fill yarns, for example, and be woven under a different number of the fill yarns.

The warp yarns 16, 18 in one presently preferred embodiment are provided in a ratio of about 2 warp multifilament yarns 16 to 1 warp monofilament yarn 18 to provide the sleeve 10 with the desired abrasion resistance, while also providing the sleeve 10 with flexibility, such that the sleeve can be readily routed around corners. For example, in a sleeve having an unfolded, flattened tape width of about 67 mm, the number of ends of warp multifilament yarns 16 can be about 70-80, while the number of ends of warp monofilament yarn 18 can be about 35-40. In this example, and without limitation, the multifilament yarns 16 can be provided having about a 900-1400 text and the monofilament yarns 18 can be provided having about a 0.20-0.30 mm diameter.

As best shown in FIG. 4, the weft or fill yarns 20, 22 are provided in a dual insertion fashion to provide pairs of the fill yarns spaced axially from one another with one fill yarn 20 being adjacent and closely abutting another fill yarn 22. In the 67 mm wide embodiment described above, the fill yarns 20, 22 are inserted having a picks per inch (PPI) of about 14-18, wherein the same types and sizes of yarn can be used as used for the warp yarns 16, 18, if desired. The fill monofilament yarns 22 provide the sleeve 10 with an increased ability to resist abrasion, and possibly a self-curling bias, as discussed above, while the fill multifilament yarns 20 provide the sleeve 10 with an increased flexibility and coverage to further protect against the ingress of contamination into the sleeve cavity 24.

In a test performed to compare the abrasion resistance between a corrugated tube, a prior art textile sleeve and a sleeve 10 constructed in accordance with the invention, the following test results were obtained.

| | Abrasion test Result (Size: 13 mm) | | |
| --- | --- | --- | --- |
| Sample | Corrugated Tube | Prior Art Textile Sleeve | [Unit: cycle] Presently Preferred Embodiment |
| 1 | 4,000 | 293 | 11,700 |
| 2 | 5,000 | 416 | 16,355 |
| 3 | | | 12,666 |
| Average | 4,500 | 355 | 13,574 |

Mass: 400 g
Thickness: 2 mm
Stroke width: 51 mm
Frequency: 150 cycles/min

As illustrated, the corrugated tube demonstrated a resistance to abrasion over an average of 4,500 cycles, the prior art textile sleeve demonstrated a resistance to abrasion over an average of 355 cycles, and the sleeve 10 demonstrated a resistance to abrasion over an average of 13,574 cycles. Accordingly, the sleeve 10 far outperformed both the corrugated tube (about 3 times as great of an ability to resist abrasion) and the prior art textile sleeve (about 38 times as great of an ability to resist abrasion). It should be noted that the prior art textile sleeve was woven having only monofilaments in the warp direction and only multifilaments in the fill direction.

Obviously, many modifications and variations of the present invention are possible in light of the above teachings. For example, it needs to be understood that the sleeves 10, 110 can be constructed other than as expressly described above in the presently preferred embodiment, and that other types and sizes of yarns can be used in the construction of the sleeves 10, 110. It is, therefore, to be understood that within the scope of the appended claims, the invention may be practiced otherwise than as specifically described.

What is claimed is:

1. A textile sleeve for protecting elongate members, comprising:

an elongate wall having warp multifilament yarns and warp monofilament yarns woven with fill multifilament yarns and fill monofilament yarns, said warp multifilament yarns and said warp monofilament yarns being woven in a warp-faced pattern in relation to said fill multifilament yarns and said fill monofilament yarns.

2. The textile sleeve of claim 1 wherein each of said fill multifilament yarns is inserted with one of said fill monofilament yarns to form dual inserted pairs of fill yarns.

3. The textile sleeve of claim 2 wherein about 2 of said warp multifilament yarns are provided for every 1 of said warp monofilament yarns.

4. The textile sleeve of claim 2 wherein said warp multifilament yarns and said warp monofilament yarns are woven in a balanced twill weave.

5. The textile sleeve of claim 1 wherein said wall is a closed, circumferentially continuous wall.

6. The textile sleeve of claim 1 wherein said wall is an open wall having a slit provided by opposite edges extending along a longitudinal axis of said sleeve.

7. The textile sleeve of claim 6 wherein said fill monofilament yarns are heat-set into a self-biased curled configuration to bring said opposite edges in overlapping relation with one another.

8. A method of constructing a textile sleeve for protecting elongate members, comprising: weaving multifilament yarns and monofilaments yarns with one another with a plurality of said multifilament yarns and said monofilament yarns providing warp yarns extending along a length of the sleeve and a plurality of said multifilament yarns and said monofilament yarns providing fill yarns extending about a circumference of the sleeve;

inserting said fill yarns in pairs with one of said fill monofilament yarns being inserted with one of said fill multifilament yarns;

and weaving said warp yarns in a warp-faced pattern.

9. The method of claim 8 further including weaving said warp yarns in a twill pattern.

10. The method of claim 9 further including weaving said warp yarns in a balanced twill pattern.

* * * * *